INVENTOR:
Tomás HORŇÁK
BY Arthur O. Klein
his Attorney

INVENTOR.
Tomáš HORŇÁK
BY Arthur O. Klein
his Attorney

United States Patent Office 3,462,685
Patented Aug. 19, 1969

3,462,685
APPARATUS FOR AUTOMATICALLY MEASURING THE REVERSE RECOVERY TRANSIENT OF A SEMICONDUCTOR DIODE
Tomáš Horňák, Prague, Czechoslovakia, assignor to Vyzkumny ustav matematickych stroju, Prague, Czechoslovakia
Filed Jan. 25, 1966, Ser. No. 522,968
Claims priority, application Czechoslovakia, Jan. 28, 1965, 592/65
Int. Cl. G01r 23/16, 23/20, 27/02
U.S. Cl. 324—158                                 1 Claim

ABSTRACT OF THE DISCLOSURE

The time integral of the reverse transient interval of a repetitively switched semiconductor diode whose output is applied to a sampling oscilloscope is automatically read out by a feedback integrating circuit coupled to the oscilloscope output. For this purpose, the integration in the feedback path is selectively effected over the corresponding reverse transient interval of the slowed-down replica waveform at the oscilloscope output, whereby the DC level of the replica is shifted by an amount proportional to the read-out integrated feedback signal and thus to the desired time integral. The diode output and the integrated feedback signal are simplified by substantially identical amounts so that the read-out is independent of the gain and time transformation factor of the oscilloscope.

---

This invention relates to apparatus for measuring the response of semiconductor switching elements and, more particularly, to apparatus for measuring the reverse recovery charge of semiconductor diodes. Accordingly, it is an object of the present invention to provide new and improved apparatus of this character.

Semiconductor diodes are now in common use as switching elements in high speed logic circuits and similar applications. In many such applications, the so-called reverse recovery time of each of the associated diodes (i.e., the finite time necessary for the diode to change from its conducting to its non-conducting state when an instantaneous switching pulse of proper polarity is applied thereto) represents a fundamental limitation on the overall circuit performance. Therefore, it is extremely important in the design of such systems to ascertain the reverse recovery time of the associated diodes with high accuracy.

The most satisfactory way of determining the reverse recovery time of a semiconductor diode has been to excite the diode with a reverse-going switching pulse and to measure the time integral of the resulting diode current transient over the interval during which the current initially passes through zero in the reverse-going direction and then decays monotonically from a maximum reverse value to a usually negligible quiescent value.

Although techniques exist for directly measuring this so-called reverse recovery charge, such techniques are not satisfactory when applied to fast diodes (e.g., those diodes having a reverse recovery charge of under 50 picocoulombs) because of the difficulty in accurately time-selecting the minute reverse recovery portion of such elements for integration purposes. In order to measure the reverse recovery time of such fast diodes, it has been necessary to operate with a low-frequency replica of the diode waveform by employing well-known oscilloscope sampling techniques.

Unfortunately, presently employed techniques of the last-mentioned type for measuring the reverse recovery charge of fast semiconductor diodes have not been entirely satisfactory because the magnitude of the measured quantity has been found to vary with the time transformation ratio employed in the sampling oscilloscope and with the overall gain of the measuring apparatus. Moreover, in such techniques, the selection of the start of the interval over which the current waveform replica is integrated is accomplished manually. This procedure is often too slow and unreliable to avoid measuring errors caused by waveform shifts as a result of variations in the diode response characteristic and in the operation of the measuring equipment. Since the reverse-going waveform excursion through zero is steep, even a small deviation in the actual zero crossing time of the measured waveform with respect to the manual setting of the start of the integration interval can result in a large measurement error.

Another object of the invention, therefore, is to provide new and improved apparatus for measuring the reverse recovery charge of a fast semiconductor diode with the aid of oscilloscopic sampling techniques, wherein the measurement is independent of the oscilloscopic time transformation ratio and the overall gain of the measuring apparatus.

A further object of the invention is to provide new and improved apparatus for measuring the reverse recovery charge of a fast semiconductor diode with the aid of oscilloscopic sampling techniques, wherein the measurement is substantially unaffected by variations in the time of commencement of the reverse recovery interval.

These and related objects are attained with the use of apparatus in accordance with the instant invention, in which a novel DC-sensitive feedback path is provided through a calibration input of the sampling oscilloscope associated with the apparatus. The low-frequency replica of the diode voltage waveform is differentially combined with an adjustable DC calibration signal over an externally selected interval corresponding to the reverse recovery time of the diode waveform to yield a control waveform. The DC calibration signal is proportional to the DC component resulting from the time integral of the control waveform over the selected interval. Means are provided for automatically triggering the selected interval upon an occurrence of a reverse-going zero crossing of the control waveform.

The DC feedback system of the invention is stabilized when the magnitude of the DC calibration signal is equal to the DC component of the diode waveform replica over the selected interval. The resulting DC calibration voltage, which may be directly read out on a DC-sensitive meter, is thus directly proportional to the reverse recovery charge of the diode waveform. Furthermore, if the oscilloscope is provided with means for amplifying the diode output voltage and the DC calibration voltage by identical amounts, the value of the reverse recovery charge can be computed, with the aid of the directly-read DC calibration voltage, in a manner that is independent of both the gain of the DC feedback path (including the gain of the oscilloscope) and the time transformation ratio of the oscilloscope.

In a preferred embodiment of the invention, the start of the negative-voltage portion of the control waveform is detected with the use of a suitably-poled auxiliary diode and a resistance element. The negative-going leading edge of the detector output triggers a gating pulse generator, which simultaneously supplies an enabling pulse of selectable length to a pair of normally disabled gates. The triggering sensitivity of the gating pulse generator is made high so that the leading edge of the enabling pulse substantially coincides with the instant of triggering, and the trailing edge of the enabling pulse is adjusted to occur within the relatively insensitive quiescent region of the reverse recovery interval. The control waveform, which is also applied to the input of a first one of the gates, is gated to an integrating circuit during the enabling interval. The DC component of the integrated waveform is applied to the calibration input of the oscilloscope through the second one of the gates during the enabling interval. The control waveform may be applied to the detector and to the first gate through an isolation capacitor, in which case a periodically keyed, normally disabled third gate is further provided at the common input of the detector and the first gate for restoring the critical DC component of the control waveform removed by the isolating capacitor.

The nature of the present invention and its various advantages and features will appear more fully from the following detailed description taken in connection with the appended drawing, in which.

Figure 1:
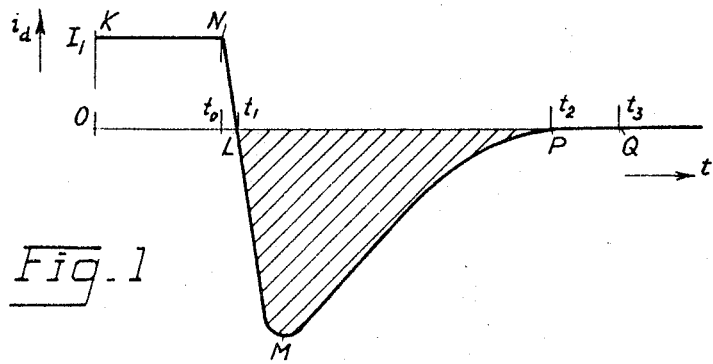
FIG. 1 is a pictorial view of the transient current waveform at the output of a semiconductor diode when the latter is switched from its conducting to its non-conducting state.

Referring in more detail to the drawing, FIG. 1 illustrates the reverse recovery process of a typical semiconductor diode when switched from its conducting to its non-conducting state. It is assumed that prior to a time $t_0$, the diode current characteristic $i_d$ is in its quiescent conducting state with a steady magnitude $I_1$ over an interval KN, as depicted. It is further assumed that at the time $t_0$ a negative-going switching pulse is applied to the diode for the purpose of switching the diode into its non-conducting state, and that the steady-state diode current after such switching has taken place is negligibly small. Nevertheless, the diode will not be switched instantaneously to the last-mentioned quiescent value but instead will follow a transient course shown by the curve portion NLMPQ. Upon the application of the above-mentioned switching pulse, the diode characteristics $i_d$ falls rapidly to a maximum negative value at point M after crossing through zero (point L) at the time $t_1$. The current characteristic decays monotonically from point M toward the negligibly small quiescent value, which is reached at a time $t_2$ (i.e., point P). After the time $t_2$, the diode current $i_d$ can be taken to be essentially zero.

Figure 2:
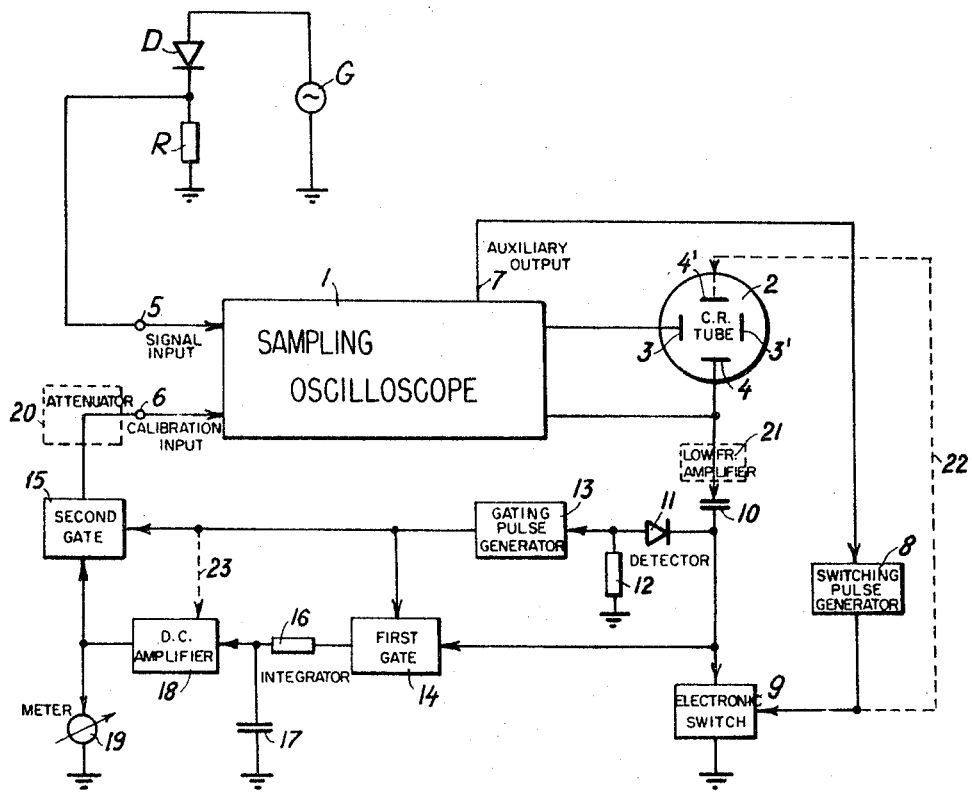
FIG. 2 is a combined block and schematic diagram showing one arrangement for measuring the reverse recovery period of the waveform of FIG. 1 in accordance with the invention.

FIG. 2 depicts an arrangement for measuring the reverse recovery charge of the diode of FIG. 1 in accordance with the instant invention. A semiconductive diode D is connected across a high frequency switching pulse generator G through a precision resistance R. The transient response of the diode D to the negative-going portions of the switching pulses from the generator G is assumed to be represented by the waveform of FIG. 1. A voltage waveform proportional to the current characteristic of FIG. 1 is developed across the resistance R and is supplied to a signal input 5 of a sampling oscilloscope 1.

The oscilloscope 1 is also provided, in a manner well known in the art, with a calibration input 6 which is assumed to be combined inside the oscilloscope 1 with the signal input 5 such that (a) signals incident at the respective inputs are amplified with equal gain A in a common sampling channel (not shown) and that (b) the so-amplified signals are combined in the common channel for display on a pair of vertical deflection plates 4, 4' of a cathode ray tube 2 associated with the oscilloscope 1. Illustratively, if the input stage of the common sampling channel is a vacuum tube triode (not shown), these conditions may be met by coupling the respective inputs 5 and 6 to the grid and cathode, respectively, of the triode.

The operating time base of the oscilloscope 1, which has a repetition rate lower than the frequency of the generator is applied (by means not shown) to a pair of horizontal deflection plates 3, 3' of the cathode ray tube 2. The time transformation factor F (i.e., the ratio of build-up time of the slowed-down picture on the cathode ray tube screen to the duration of the actual time interval on the input signal respresented by said picture) may be manually set with the use of a standard calibration oscillator (not shown) of the oscilloscope 1, and is assumed to be adjusted such that a replica of the entire waveform of FIG. 1 together with a significant quiescent interval beyond the time $t_2$ thereof is visible on the face of the screen 2. The quiescent interval displayed is assumed to be greater than the last tenth of the interval corresponding to the width of the screen, for reasons set forth below.

The oscilloscope 1 is also provided with an auxiliary output 7, which may be in the form of a brightness control pulse triggered at the start of each time base interval of the oscilloscope for blanking the flyback portion of the sawtooth voltage applied to the horizontal deflection plates 3, 3'.

The output of the common sampling channel is also coupled through a first capacitor 10 to a normally open electronic switch 9, whose purpose will be explained below. A diode 11, suitably poled, is serially connected with a resistance 12 across the switch 9 to detect the negative portion of the waveform at the sampling channel output, as modified by the capacitor 10 and the switch 9. (The net modification may be zero, as explained hereinafter.) The output of the detecting circuit 11, 12 is taken across the resistance 12 and is applied to a triggering input of a gating pulse generator 13, which is designed to yield an output pulse of selectable length when triggered by the negative-going leading edge of the detected waveform at the output of the second resistance 12.

The output of the common sampling channel of the oscilloscope is also coupled through the first capacitor 10 to the input of a normally disabled first gate 14, which is enabled during the interval of the output pulse from the gating pulse generator 13. The input of the first gating circuit 14 is also connected in parallel to the input of the detector 11, 12. The output of the first gating circuit 14 is applied to an integrating circuit formed by a resistance 16 and a capacitor 17. The integrated output of the first gate 14, which is taken across the capacitor 17, is applied to the input of an amplifier 18, which amplifies the DC component at the output of the integrating circuit 16, 17 to a value suitable for accurate indication on a DC voltmeter 19 connected to the output of the amplifier 18. The DC output of the amplifier 18 is also applied to the input of a normally disabled second gating circuit 15. The second gating circuit 15 is enabled in synchronism with the first gate 14 by the gating pulse generator 13 for applying the DC voltage indicated on the meter 19 to the calibration input 6 of the oscilloscope 1 during the enabling interval.

In operation, the diode output waveform of FIG. 1, which is applied to the signal input 5 of the oscilloscope 1, is amplified and time-transformed in the common sampling channel. Its replica at the output of the vertical channel of the oscilloscope 1 is shown by the partially dotted curve K'N'L'M'P', which corresponds point by point to the curve KNLMP of FIG. 1 so that the instants $t_0'$, $t_1'$ and $t_2'$ individually correspond to the instants $t_0$, $t_1$ and $t_2$ of FIG. 1.

Prior to the occurrence of an enabling pulse from the output of the gating pulse generator 13, the second gate 15 is disabled and no signal is present at the calibration input 6. Thus, during the interval $0-t_1'$ of FIG. 4, the output waveform of the oscilloscope consists of the low-frequency replica K'N'L' corresponding to the positive voltage portion KNL of the waveform (FIG. 1) applied to the signal input 5. During this positive voltage interval, therefore, no output from the detector 11, 12 will appear and the gating pulse generator 13 remains in its quiescent state.

Figure 4:
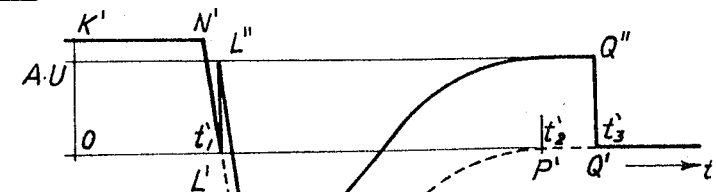
FIG. 4 is a pictorial view of a composite control waveform at the output of the oscilloscope of FIG. 2.

At the instant $t_1$ when the waveform of FIG. 4 reverses polarity, the detector 11, 12 will be activated to trigger the gating pulse generator 13. The latter, in turn, opens the first gate 14 and the second gate 15 with the leading edge of the enabling pulse at its output. Since this leading edge may be made substantially instantaneous with the trigger from the detector 11, 12, the start of the interval over which the output of the first gate 14 is integrated by the RC circuit 16, 17 is automatically fixed at the instant of zero crossing.

Figure 3:
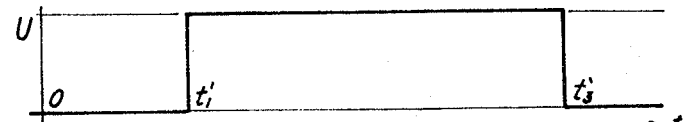
FIG. 3 is a pictorial view of a voltage waveform at the calibration input of a sampling oscilloscope employed in connection with the arrangement of FIG. 2.

The gating pulse generator 13 is adjusted such that the trailing edge of the enabling pulse at its output will occur at a time $t_3'$ (point Q) beyond the point (P') at which the waveform replica K'N'L'M'P' corresponding to the diode waveform at the signal input 5 has decayed to its substantially zero quiescent value. Thus, the first gate 14 and the second gate 15 will be enabled over the interval $t_1'-t_3'$ during which the DC voltage U at the output of the amplifier 18 will be applied to the calibration input 6 through the now enabled second gate 15. The DC calibration voltage at the input 6 is depicted in FIG. 3.

During the interval $t_1'-t_3'$, the diode waveform of FIG. 1 and the DC calibration voltage U are simultaneously amplified by the factor A in the common sampling channel of the oscilloscope 1 and are then added in phase opposition to form a composite output of the sampling channel. The composite output waveform, which is represented by the solid curve portion L'L"M"Q" of FIG. 4, is identical to the dotted portion L'M'P'Q' except for an upward DC shift by an amount AU.

It will be noted that the negative-going zero crossing of the solid curve L'L"M"Q", a short time after the triggering time $t_1'$, occurs during the enabling interval $t_1'-t_3'$ of the gates 14, 15 and will have no adverse effect on the operation of the illustrated circuit.

Since the gate 14 is open only during the interval $t_1'-t_3'$, the waveform integrated by the RC circuit 16, 17 will be the composite waveform represented by the solid curve L'L"M"Q" of FIG. 4. Thus, the DC voltage U will be proportional to the average time integral, i.e., the DC level of the composite waveform L'L"M"Q". Thus, a signal proportional to the DC level of the composite waveform is applied to the calibration input 6 of the oscilloscope at the same time that the DC level itself is applied to the gate 14 from the output of the oscilloscope (provided that the DC component extracted by the capacitor 10 is restored as described below). In this situation, it is apparent that a DC-sensitive feedback path is formed by the oscilloscope 1, the first gate 14, the integrating circuit 16, 17, the DC amplifier 18, and the second gate 15. This feedback path will be in equilibrium when the DC component of the composite waveform at the input of the first gate 14 is zero. This, in turn, occurs when the diode replica waveform L'M'P'Q' of FIG. 4 is shifted upward by its average value over the interval $t_1'-t_3'$, i.e., by an amount proportional to the reverse recovery charge $Q_z$ of the diode waveform of FIG. 1. Moreover, since this upward shift is identically equal to the amplified value of the DC voltage applied to the calibration input 6 over the interval $t_1'-t_3'$, the corresponding indication on the meter 19 under equilibrium conditions can be simply employed in the mathematical computation of the charge $Q_z$ as follows:

It will be recognized from FIG. 1 that $$Q_z = \int_{t_1}^{t_2} i_d dt \qquad (1)$$

Now, the current $i_d$ flows through the precision resistance R to develop an input voltage $u_i$ on the input 5 of the oscilloscope such that $$Q_z = \frac{1}{R} \int_{t_1}^{t_2} u_i dt \qquad (2)$$

It follows from the above discussion that the DC feedback path of FIG. 2 will be stabilized when the average voltage of the amplified diode replica waveform over the interval $t_1'-t_3'$ equals the amplified DC calibration voltage over the same interval. Thus, in mathematical terms, the system of FIG. 2 will be stabilized when $$\left[ \frac{1}{t_3'-t_1'} \int_{t_1'}^{t_3'} Au_i dt' \right] + AU = 0 \qquad (3)$$

However, since the voltage $u_i$ is effectively zero after the time $t_2'$, $$\int_{t_1'}^{t_3'} Au_i dt' = \int_{t_1'}^{t_2'} Au_i dt' \qquad (4)$$

Moreover, since the time variable $t'$ on the oscilloscope screen represents the real time variable $t$ transformed by the factor F, $$\int_{t_1'}^{t_2'} Au_i dt' = \int_{t_1}^{t_2} Au_i(Fdt) = AF \int_{t_1}^{t_2} u_i dt \qquad (5)$$

combining Equations 3–5, $$\left[ \frac{AF}{t_3'-t_1'} \int_{t_1}^{t_2} u_i dt \right] + AU = 0 \qquad (6)$$

combining Equations 2 and 6, $$\left[ \frac{AF}{t_3'-t_1'} (Q_z R) \right] + AU = 0 \qquad (7)$$

$$\therefore Q_z = \frac{-U(t_3'-t_1')}{RF} = \frac{U}{R}(t_3-t_1) \qquad (8)$$

From Equation 8 it is noted that the desired quantity $Q_z$ is the product of an easily computed equivalent current $U/R$ and an interval $(t_3-t_1)$, which is merely the width of the enabling pulse from the generator 13 when read in real time units by reference to the setting of the calibration oscillator on the oscilloscope 1.

Thus it can be seen that the arrangement of FIG. 2 not only automatically tracks the zero crossing time $t_1'$ as the start of the interval over which measurement of $Q_z$ begins but also permits the determination of the desired quantity independent of the time transformation ratio F of the oscilloscope 1 and the overall gain of the DC feedback path of FIG. 2.

The switch 9 is provided to assure that the DC component of the composite waveform of FIG. 4 is transmitted unaffected to the input of the first gating circuit 14 despite the presence of the isolating capacitor 10. To accomplish this function, the switch 9 is closed for a predetermined portion of the oscilloscope time base interval by means of enabling pulses applied thereto from a switching pulse generator 8. The generator 8 may be triggered at the start of the oscilloscope time base interval by the application thereto of pulses from the auxiliary output 7 of the oscilloscope 1. However, the switching pulse generator 8 is additionally provided with suitable means for delaying the start of the switching pulse at its output from the time of occurrence of the trigger pulse until the start of approximately the last tenth of the time interval displayed on the screen 2, during which time the amplitude of the sampling channel output has been assumed to be zero. The width of this switching pulse is made approximately equal to one tenth of the time base interval, so that the inputs of the detector 11, 12 and the first gate 14 are short circuited during the last tenth of the interval depicted on the screen. This arrangement of the switch 9 and the triggered generator 8 assures that a predetermined portion of the signal waveform has a definite amplitude (i.e., zero) on the switched side of the capacitor 10. This clamping action prevents any undesired shift in DC level during the passage of the composite waveform of FIG. 4 through the capacitor 10 to the first gating circuit 14.

It is apparent that the voltage $u_1$ at the signal input 5 should be small so as not to degrade the diode waveform that is to be analyzed. Thus, the voltage U on the calibration input 6 should also be small when the feedback path of FIG. 2 is stabilized. On the other hand, if the voltage U is too small, the sensitivity of the meter 19 and the gate 15 will be adversely affected. Advantageously, these conflicting requirements may be resolved by employing a large voltage U at the input of the gating circuit 15 and simultaneously incorporating a precision resistive voltage divider 20 of large ratio between the output of the gate 15 and the calibration input 6. The resulting decrease in gain around the feedback path of FIG. 2 can be compensated, e.g., by increasing the gain of the DC amplifier 18.

In many cases the components 8–20 of FIG. 2 will be physically located at a significant distance from the sampling oscilloscope 1. In such a case, the capacitor 10 may be connected to the output of the common sampling channel, whose AC output voltage is generally very low, through a length of cable. In order to prevent the output of the common channel from being excessively loaded by the capacity of the cable, and at the same time to present a significant AC input to the switch 9, the first gate 18 and the detecting circuit 11, 12 for optimum operation, a linear AC amplifier 20 may be incorporated on the oscilloscope side of the capacitor 10. The amplifier 20 may be conveniently formed from several capacitively coupled stages employing negative feedback.

It is also advantageous to make provision in the arrangement of FIG. 2 for visually displaying only the enabling pulse from the gating pulse generator 13 for purposes of width adjustment, since the gating interval may be obscured in the composite waveform of FIG. 4. This may be done by incorporating a multipole switch (not shown) in the arrangement shown in FIG. 2. The switch may be adjusted in a straightforward manner to simultaneously (a) decouple the signals at the signal input 5 and the calibration input 6 from the oscilloscope 1; (b) decouple the gating circuit 13 from its normal input and output; and (c) couple the gating pulse generator 13 between the auxiliary output 7 of the oscilloscope 1 and the vertical deflection plates 4, 4'.

In the arrangement shown, the trailing edge of the enabling pulse from the generator 13 should be adjusted to occur before the start of the last tenth of the total interval depicted on the screen 2. Otherwise, the clamping interval of the switch 9 will not coincide with the occurrence of the essentially zero output region of the composite waveform at the oscilloscope output and will impair the required DC restoration function. In order to display the relative times of occurrence of the start of the clamping interval and the trailing edge of the enabling pulse (i.e., the end of the non-zero portion of the composite waveform), the output of the switching pulse generator 8 may also be coupled to the brightness modulation electrode (not shown) of the cathode ray tube for indicating the start of the clamping interval by a corresponding local brightening or darkening of the display. Alternatively, the output of the generator 8 may be applied, as by a connection 22, to the vertical deflection plate 4' of the screen 2. In this way the switching pulse from the generator 8 may be displayed directly on the screen 2 without affecting conditions on the capacitor 10 and therefore without affecting the DC restoration function of the switch 9.

It may also be desirable to selectively display the low frequency replica of the diode waveform alone for purposes of monitoring the reverse recovery interval without affecting the accuracy of the measurement of $Q_z$ indicated above. To accomplish this, a frequency divider (of the type shown in more detail in FIG. 9, discussed below) is incorporated in the gating pulse generator 13. When this is done, the frequency of occurrence of the enabling pulses from the generator 13 is one-half of the operating rate of the oscilloscope time base. Accordingly, the calibration input 6 of the oscilloscope will be excited during alternate sweeps of the oscilloscope time base. The solid line waveform $K'N'L'L''M''Q''$ of FIG. 4 will then alternate with the partially dotted diode replica waveform $K'L'M'P'Q'$ so that the latter may be conveniently isolated for display.

That this latter procedure does not adversely affect the determination of the quantity $Q_z$ can be readily seen. When the frequency divider is incorporated in the generator 13, the recurrence period of enabling of both gates 14 and 15 is doubled. With a fixed operating time base of the oscilloscope 1, its effective time transformation ratio F is preserved, and the validity of Equation 8 is unaffected.

Figures 6, 8:
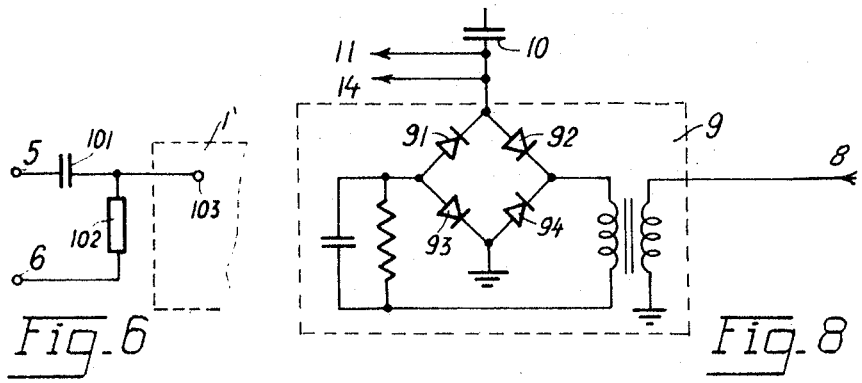
FIG. 6 is a schematic diagram of an arrangement for coupling the calibration input and the signal input of the oscilloscope of FIG. 2 to a common sampling channel.
FIG. 8 is a schematic diagram of a first form of gating circuit that may be employed in the arrangement of FIG. 2.

FIG. 6 shows one manner in which the signal and calibration inputs 5, 6 may be coupled to a common control electrode 103 of the oscilloscope. This arrangement may be used when the sampling channel (designated 1' in FIG. 6) is not provided with a pair of equally sensitive control electrodes e.g., the grid and cathode of a vacuum tube triode. The common control electrode 103 is coupled to the signal input 5 through a capacitor 101 and to the calibration input 6 through a resistance 102. In the event that the input impedance of the sampling channel is at least one order of magnitude higher than the resistance 102, satisfactory operation is assured if the time constant of the combination of the capacitor 101 and the resistance 102 is simultaneously at least one order of magnitude larger than the period of the generator G and at least one order of magnitude smaller than the enabling interval of the gates 14, 15. In the event that the input impedance of the channel 1' is not higher by at least one order of magnitude than the resistance 102, the above-mentioned time constant must take into account the shunting effect of such input impedance on the resistor 102. Moreover, in such a case, the amplitude of the calibration signal at the input 6 will be diminished by the voltage-dividing effect of the resistance 102 and the above mentioned input impedance.

Figure 7:
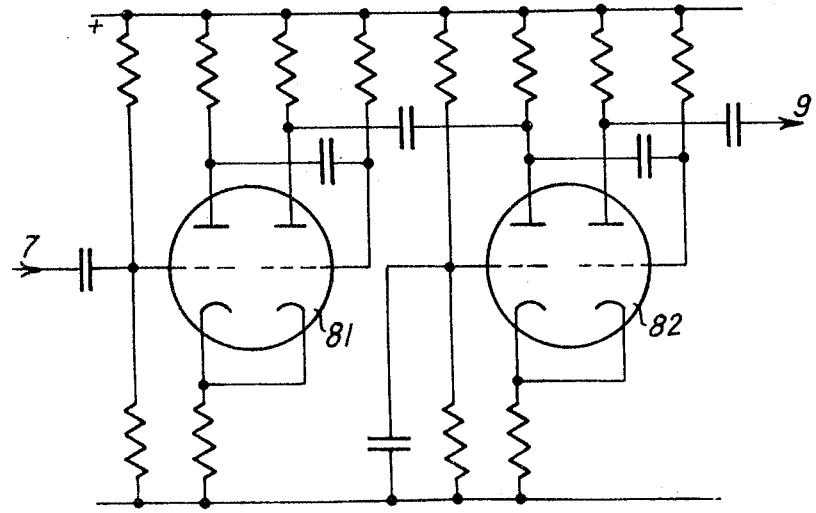
FIG. 7 is a schematic diagram of a first form of pulse generator that may be employed in the arrangement of FIG. 2.

FIG. 7 shows an illustrative embodiment of the switching pulse generator 8. This embodiment consists of a first monostable multivibrator 81 capacitively coupled to the auxiliary output 7 of the oscilloscope 1. The trailing edge of the output pulse from the multivibrator 81 is adjusted to coincide with the start of the clamping interval on the screen 2, and triggers a second monostable multivibrator 82 adapted to supply a switching pulse to the switch 9 during the clamping interval.

FIG. 8 shows an illustrative embodiment of the switch 9. The latter is depicted in the form of a diode bridge 91, 92, 93, 94. The output of the oscilloscope sampling channel, and the inputs of the detector 11, 12 and the first gating circuit 14, are connected in common between the junction of the diodes 91 and 92 and the junction of the diodes 93 and 94. The switching pulses from the generator 8 are applied between the junction of the diodes 91 and 93 and the junction of the diodes 92 and 94.

Figure 9:
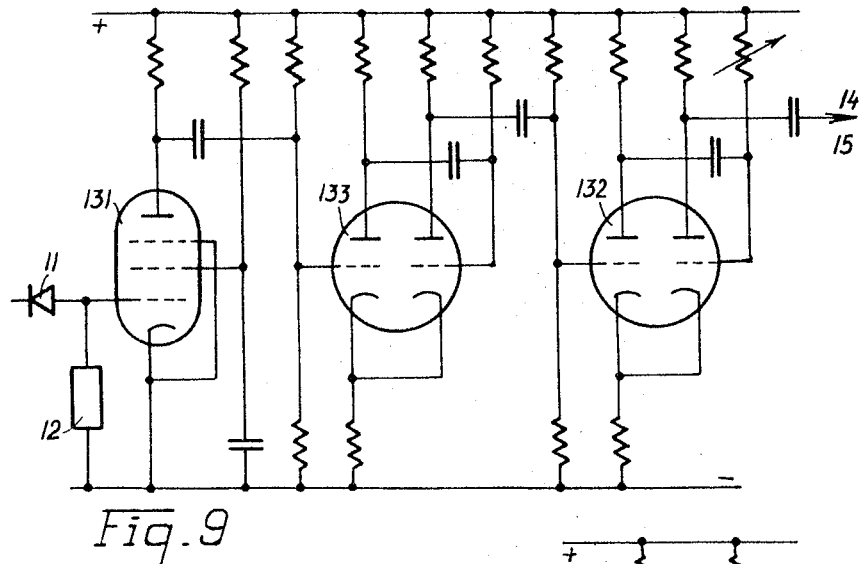
FIG. 9 is a schematic diagram of a second form of pulse generator that may be employed in the arrangement of FIG. 2.

FIG. 9 depicts one embodiment of the gating pulse generator 13. An input triggering amplifier 131 is coupled to the output of the detector 11, 12 to assure a high triggering sensitivity of the generator 13. The output of the triggering amplifier 131 is coupled to the input of a third monostable multivibrator 132. The width of the output pulse of the multivibrator 132 is made manually selectable. In the event that provision is made for monitoring the replica of the waveform of FIG. 1 during the reverse recovery charge measurement in the manner described above, a frequency-dividing multivibrator 133 may be interposed between the output of the triggering amplifier 131 and the input of the third multivibrator 132. The pulse width of the divider 133 should be longer than the period of the time-base sawtooth waveform applied to the horizontal deflection plates 3, 3'.

Figures 10, 11:
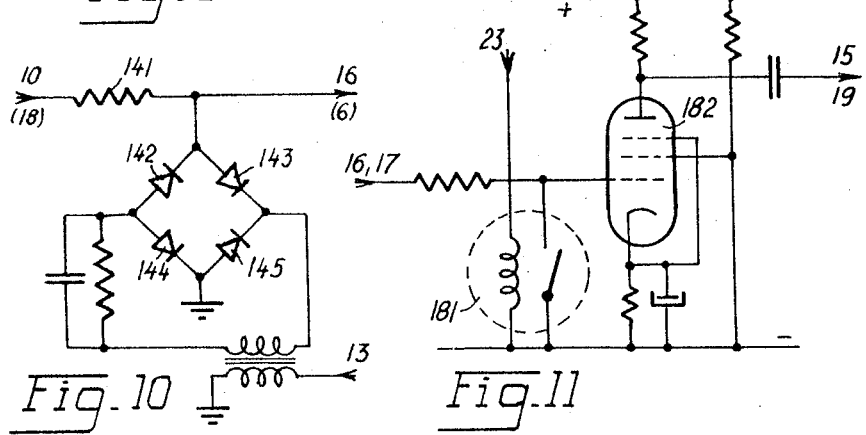
FIG. 10 is a schematic diagram of a second form of gating circuit that may be employed in the arrangement of FIG. 2.
FIG. 11 is a schematic diagram of one form of DC amplifier that may be employed in the arrangement of FIG. 2.

FIG. 10 shows one embodiment of the gating circuits 14 and 15, which may be identical. This embodiment, which incorporates a series resistance 141 and a shunt diode bridge 142, 143, 144 and 145, has a high DC stability for efficient function of the feedback loop of FIG. 2. The input and output of the device are taken between the junction of the diodes 144 and 145 and the input and output leads, respectively, of the resistance 141. The enabling pulses from the gating pulse generator 13 are applied between the junction of the diodes 142 and 144 and the junction of the diodes 143 and 145.

Figure 5:
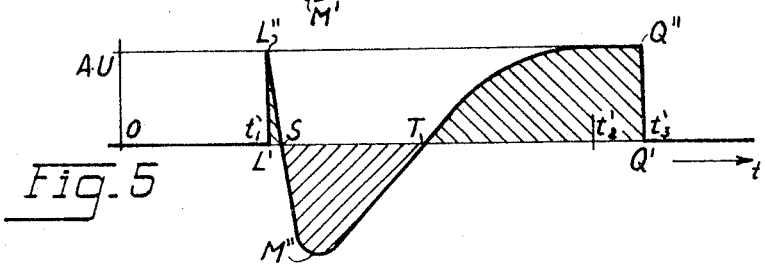
FIG. 5 is a pictorial view of a waveform occurring at a different point of the arrangement of FIG. 2.

The direct current amplifier 18 should have a good zero stability and a high amplification so that the DC voltage at the input thereto (and thus the DC component of the waveform (FIG. 5) on the gate 14 when the circuit of FIG. 2 is stabilized), may be made extremely small for optimum resolution. One suitable embodiment for the amplifier 18 is shown in FIG. 11. Direct current is applied from the integrating network 16, 17 to a chopper amplifier having an input mechanical modulator 181 for converting the DC input to an AC signal. The output of the modulator 181 is amplified by one or more capacitively-coupled high gain AC amplifier stages 182 (one of which is shown in FIG. 11), and then rectified by a phase-sensitive rectifier. In order to prevent residual AC components, unavoidably present at the output of the integrating circuit 16, 17 during the enabling interval, from saturating the high gain stages 182, the enabling pulses from the generator 13 are applied through a connection 23 to a control coil of the modulator 181 for short-circuiting the first stage 182 during the enabling interval.

In the foregoing, the invention has been described in connection with preferred arrangements thereof. However, since many other variations and modifications will now become obvious to those skilled in the art, it is accordingly desired that the breadth of the claims not be limited to the specific disclosure herein contained.

What is claimed is:

1. Apparatus for automatically generating a quantity proportional to the time integral of the reverse interval of the transient characteristic exhibited by a semiconductor diode that is repetitively switched at a first rate between a forward quiescent conducting state and a reverse quiescent nonconductive state of substantially zero amplitude, which comprises:

a sampling oscilloscope for generating a slowed-down replica of an input waveform applied thereto, said oscilloscope comprising, in combination, a signal input for receiving the input waveform, a calibration input, means for amplifying signals respectively applied to the signal input and calibration input by substantially identical amounts, and means for adding the slowed-down replica of the amplified waveform applied to the signal input with the amplified signal applied to the calibration input to form the output of the oscilloscope;

means for coupling the output of the repetitively switched diode to the signal input;

an integrating circuit;

first normally disabled gating means for coupling the output of the oscilloscope to the input of the integrating circuit;

second normally disabled gating means for coupling the DC component at the output of the integrating circuit to the calibration input of the oscilloscope;

means coupled to the output of the oscilloscope for generating a control pulse upon the occurrence of a reverse-going zero crossing of the replica waveform at the oscilloscope output;

a pulse generator rendered effective upon the occurrence of each control pulse for generating a gating pulse having a duration substantially equal to the nonzero portion of the reverse interval of the corresponding amplified diode replica waveform; and means for coupling the gating pulses to the first and second gating means to enable said means over said nonzero portion and to complete a DC feedback path between the output of the oscilloscope and the calibration input, whereby the DC output component of the integrating means is proportional to the time integral of the reverse interval of the diode transient characteristic.

References Cited

UNITED STATES PATENTS 3,011,129  11/1961  Magleby _____ 328—151

OTHER REFERENCES

Solid-State Electronics, "Reverse Recovery Time Measurements of Epitaxial Silicon P-N Junctions at Low Temperatures" (H. J. Fink), vol. 7, No. 11, November 1964, pages 823–831.

RUDOLPH V. ROLINEC, Primary Examiner

E. L. STOLARUN, Assistant Examiner

U.S. Cl. X.R.

324—77, 121